United States Patent [19]

Watanabe

[11] Patent Number: 4,631,130
[45] Date of Patent: Dec. 23, 1986

[54] PLASMA SEPARATOR

[75] Inventor: Masaharu Watanabe, Kawasaki, Japan

[73] Assignee: Terumo Corporation, Tokyo, Japan

[21] Appl. No.: 793,479

[22] Filed: Oct. 29, 1985

Related U.S. Application Data

[63] Continuation of Ser. No. 520,226, Aug. 4, 1983, abandoned, which is a continuation of Ser. No. 302,551, Sep. 16, 1981, abandoned.

[30] Foreign Application Priority Data

Sep. 25, 1980 [JP] Japan .................. 55-133171
Sep. 26, 1980 [JP] Japan .................. 55-134102

[51] Int. Cl.$^4$ ............................ B01D 13/00
[52] U.S. Cl. ..................... 210/651; 210/343; 210/346; 210/433.2
[58] Field of Search ............ 210/651, 343, 500.2, 210/346, 490, 433.2, 321.1

[56] References Cited

U.S. PATENT DOCUMENTS

| | | | |
|---|---|---|---|
| 3,133,132 | 5/1964 | Loeb et al. | 210/321.1 X |
| 3,343,681 | 9/1967 | Madden | 210/343 |
| 3,827,563 | 8/1974 | Boe et al. | 210/500.2 X |
| 3,883,626 | 5/1975 | Kamide et al. | 210/490 X |
| 3,932,283 | 1/1976 | Esmond | 210/321.3 |
| 3,945,926 | 3/1976 | Kesting | 210/500.2 |
| 4,115,274 | 9/1978 | Boddeker et al. | 210/346 X |
| 4,159,251 | 6/1979 | Wrasidlo | 210/500.2 X |
| 4,191,182 | 3/1980 | Popovich | 210/433.2 X |
| 4,308,145 | 12/1981 | Higley et al. | 210/500.2 X |

FOREIGN PATENT DOCUMENTS

| | | |
|---|---|---|
| 0005536 | 11/1979 | European Pat. Off. |
| 2028325 | 12/1970 | Fed. Rep. of Germany |
| 2265243 | 1/1977 | Fed. Rep. of Germany |
| 53-67683 | 6/1978 | Japan |
| WO79/01120 | 12/1979 | PCT Int'l Appl. |
| 1283273 | 7/1972 | United Kingdom |
| 1555389 | 11/1979 | United Kingdom |
| 1558370 | 12/1979 | United Kingdom |
| 1558807 | 1/1980 | United Kingdom |
| 2040724 | 9/1980 | United Kingdom |

OTHER PUBLICATIONS

"Continuous Flow Membrane Filtration of Plasma from Whole Blood" from Amicon Corp. Lexington, Mass., American National Red Cross, Bethesda, Md., Publication No. 413, and Massachusetts Institute of Technology, Cambridge, Mass. (Trans. Am. Soc. Artif. Intern. Organs, XXIV, 21-26 (1978)).

Primary Examiner—Frank Spear
Attorney, Agent, or Firm—Frishauf, Holtz, Goodman & Woodward

[57] ABSTRACT

A filter membrane housed in a casing is a microporous membrane manufactured by the phase separation method and having a pore size of 0.1 to 0.8$\mu$, preferably 0.2 to 0.6$\mu$, and a thickness of 100 to 300$\mu$. At least one membrane unit comprising of such a membrane covering a core material is arranged inside the casing to define a blood channel of 50 to 150$\mu$ channel thickness.

16 Claims, 16 Drawing Figures

PLASMA SEPARATOR

This application is a continuation of application Ser. No. 520,226 filed Aug. 4, 1983 which in turn is a continuation of Ser. No. 302,551 filed Sept. 16, 1981, both now abandoned.

BACKGROUND OF THE INVENTION

I. Field of the Invention

The present invention relates to a plasma separator and, more particularly, to a plasma separator through which blood is continuously flowed for filtering to separate the blood cells components, i.e., the packed blood cells solution, from the plasma.

II. Description of the Prior Art

As a method for separating plasma using a plasma separator of this type, a method for separating blood components by centrifugation is known. However, this method has various drawbacks. For example, the separation treatment rate per unit time is small, resulting in a long time and much labor for treatment of a large amount of blood. Furthermore, the separation treatment is complex in procedure, and the blood may be contaminated during the treatment.

Another plasma separating method is known which utilizes as a filter membrane a membrane with pores formed by bombarding a thin film of polycarbonate with charged particles.

Such a filter membrane has pores of precise size since the charged particles are used to bombard the thin polycarbonate film. However, the pores of the membrane may coincide in places. In order to prevent this, the porosity may only be made as high as 15 to 30%, so that a satisfactory filtering efficiency, thus, a satisfactory plasma filtration rate, may not be obtained. The polycarbonate used as the raw material of the membrane cannot remain flat when heat is applied thereto. The polycarbonate also allows many pinholes to form, limiting the range of application of this type of membrane. This type of membrane makes the structure of the plasma separator complex and bulky. Further, a membrane of this type cannot withstand use over a long period of time, and the drop in the plasma filtration rate with time is significant.

Still another plasma separating method utilizes a so-called hollow fiber membrane. A plasma separator using such hollow fiber membranes may be suitably used for a system in which blood is continuously flowed for separation, and the filtered blood is returned to the body from which the blood is taken.

More tension is exerted on the hollow fiber membranes during the manufacture thereof along the longitudinal direction, that is, along the direction of the channel length, than on flat membranes. Moreover, since there is no support means for supporting the membranes during manufacture, the shape of the pores formed becomes slightly oblong. Since it is difficult to maintain a uniform tension, it is difficult to obtain a uniform pore size. The pore distribution on the membranes thus becomes random, and precision in the manufacture of the membranes is considerably degraded. When performing the plasma separation using this type of membrane, the maximum pore size selected must be small in order to prevent leakage of the blood cells. As a result, the filtering efficiency of the blood cells components are significantly lowered. From the viewpoint of the structure, if the channel length of the blood channels is made short, the loss of the effective membrane area is enlarged and leakage occurs more frequently. If, however, the channel length is made long in consideration of this, the pressure drop increases, giving rise to hemolysis. Since the diameter of the hollow fiber cannot be made smaller than a certain limit imposed by the techniques involved in the manufacture of the membranes, the filtering efficiency per unit area of the membrane is lowered. When an attempt is made to make the membranes thinner in order to increase the plasma filtration rate, the strength of the membranes is lowered, leading to more frequent leakage of blood and variation in the pore size distribution of the membranes.

Under the circumstances as described above, the plasma separating method using the hollow fiber membranes has been unsatisfactory.

U.K. Pat. No. 1,555,389 discloses an ultrafilter in which a number of flat filtering elements are piled, each consisting of a substrate of open screen mesh and a membranous filtering medium covering the substrate. This patent shows the manner according to which the body fluid is filtered by this ultrafilter. Such a piled structure is preferable for the purpose of making the overall ultrafilter compact. However, this structure also has various problems. For example, it is difficult to make the flow path sufficiently thin, and the filtering membrane is low in wall shear rate, leading to an insufficient filtering efficiency. Also, the fluctuation in the filtration rate is great, leading to damages to the blood such as occurrences of hemolysis and coagulation. Further, the filter disclosed in the U.K. Patent, which is used for ultrafiltration, is incapable of filtering protein and, thus, is unsuitable for the plasma separation. In addition, leakage tends to occur in the case of separation of blood.

With a view to eliminating these disadvantages of the conventional device, there has been proposed a filter device which comprises a slender manifold plate provided at one end thereof with a blood inlet and at the other end thereof with a blood outlet, filter membranes attached to both sides of the manifold plate through the medium of interposed rubber gaskets incorporating 3 parallel channels, and collection plates provided with blood plasma vents and disposed so as to hold the filter membranes fast against the manifold plate [Trans. Am. Soc. Artif. Intern. Organs, XXIV, 21–26 (1978)]. Since the flow path has a great length compared with its width, this device entails a heavy pressure drop which gives rise to hemolysis and mars the practical worth of the device.

For plasma separation, the present inventor has made extensive researches on taking into consideration of microporous membranes manufactured by extrusion, stretching and so on. The membranes manufactured by these methods have more rough surfaces than the thin films of polycarbonate as described above. These membranes are also inferior to the polycarbonate membranes in terms of uniformity of pore size. For this reason, it has been considered that deterioration of the blood, such as hemolysis or coagulation, may be increased and plasma components may not sufficiently permeate the membranes. Accordingly, an improvement in the membranes for blood filtering is a matter of serious concern in this field.

SUMMARY OF THE INVENTION

It is an object of the present invention to provide an improved plasma separator according to which excessive blood deterioration such as coagulation or hemolysis does not occur, the filtering efficiency is high, and the decrease in the plasma filtration rate with time is small.

In order to achieve this object, many experiments were conducted on filter membranes themselves. As a result of these experiments, a microporous membrane has been developed as a membrane particularly suitable for plasma separation. It is manufactured by the phase separation method and has a pore size of 0.1 to 0.8μ, preferably 0.2 to 0.6μ. A core material is covered by this microporous membrane to provide a membrane unit. At least one membrane unit is arranged within a casing with a blood inlet port, a filtrate outlet port, and a blood outlet port. The channel thickness of the blood channel is set to be 50 to 150μ. In this manner, a plasma separator which achieves the filtering performance as described above has been provided.

The "phase separation method" as described above is a method for manufacturing a desired membrane by preparing a solution of a raw material for a microporous membrane with a good solvent and a poor solvent, casting the solution over a support plate with a mirror surface to a uniform thickness, drying the spread film, and peeling the film off the support plate. In the case of using cellulose acetate as a raw material for a microporous membrane, it is desirable to use acetone or methylene chloride as the good solvent, and alcohol or water as the poor solvent. This method itself is already known. In the industrial application of the method, an endless belt with a mirror surface is used as the support plate, and the solution is continuously spread over the surface of this belt to provide the flat film. Unlike the case of the hollow fiber membranes as described above, the manufacture of the membranes by the phase separation method has an advantage in that the use of the support plate allows prevention of nonuniformity or deformation of the pore shape, resulting in uniform pores.

The "pore size" as used herein indicates the maximum pore size according to the bubble point method. Various other methods may be adopted as a method for indicating the pore size. However, if the phase separation method is adopted, the indication of the maximum pore size will allow easy estimation of the minimum pore size and the pore distribution, and the measurement is easy. Therefore, the definition of the pore size as described above is selected in this specification.

The pore size which may be practically adopted for the plasma separation is about 0.005 to 1.2μ. When the pore size is smaller than the lower limit, the protein component in the plasma has difficulty passing through the pores. When the pore size is larger than the upper limit, the blood cells components leak through the membranes. According to the present invention, the pore size is specified as 0.1 to 0.8μ, preferably 0.2 to 0.6μ. This is because when the pore size has been set in this range, the separation of the blood cells components from the plasma components may be performed in an extremely efficient manner, free passage of the protein components in the plasma is permitted, permeation of the blood cells components through the membranes is prevented, and deterioration of the blood cells components is virtually eliminated.

The "channel thickness" of the blood channels as described above according to the present invention will be described briefly with reference to FIGS. 1(a) and 1(b). FIG. 1(a) schematically shows a pair of rectangular, flat membrane units. The blood to be treated for separation flows between these two membrane units from the direction shown by arrow A. These two membrane units define a blood channel therebetween, and the width of the gap therebetween is a channel thickness b. In other words, the size of the blood channel in the direction perpendicular to the direction of blood flow and to the surfaces of the membrane units is the channel thickness.

The size of the blood channel along the direction of blood flow is a channel length l. The size of the blood channel along the direction perpendicular to the direction of blood flow and parallel to the membrane units is a channel width a.

Circular membrane units as schematically shown in FIG. 1(b) are so constructed that blood introduced from the central hole of the membrane units flows through the gap between these membrane units radially outward, as shown by the arrow A.

The blood channel in FIG. 1(b) is the space between the two membrane units, and the channel thickness b is the gap between the membrane units as in the case of FIG. 1(a) The channel length l is the length of the membrane unit in the radial direction from its inner to its outer periphery. The channel width a in this case, although not shown in the figure, may be given by the following equation:

$$a = \frac{a_1 - a_2}{\ln(a_1/a_2)} \times N$$

where
$a_1$: length of the outer periphery of the membrane unit
$a_2$: length of the inner periphery of the membrane unit
N: number of blood channels Although FIGS. 1(a) and 1(b) show typical examples of the shape of the membrane units, membrane units of other shapes may similarly be adopted. Furthermore, although the description has been made with reference to a blood channel formed between a pair of membrane units, the definition may be similarly applied to the case wherein one of the membrane units is replaced by the wall of a casing or by another plate.

"Effective membrane area" S to be described later may be given by the following equation:

$$S = a \times l$$

"Blood flow rate" indicates the amount of blood which flows through the blood channel per unit time, for example, per second.

When the blood flow rate is represented by $Q_B$, the shear rate by $\dot{\gamma}$, and the pressure drop by PD, the following relations hold:

$$\dot{\gamma} = 6Q_B/ab^2$$

$$PD = 12Q_B \mu l/ab^3$$

where μ is the blood viscosity.

In order to lessen the pressure drop which is the main factor in the hemolysis and to increase the shear rate for a higher plasma filtration rate, it was found effective to increase the channel width a and to decrease the channel length l and the channel thickness b relative to the channel width a, assuming that the effective membrane area and the blood flow rate remain the same.

Theoretically, it is preferable that the channel thickness b satisfy the relation $0 < b \leq 150$ ($\mu$). However, in practice, it is preferable that the channel thickness b satisfy the relation $50 \leq b \leq 150$ ($\mu$) due to size errors and deformation and distortion of the membranes and the supports during manufacture. It has been confirmed that the channeling of the blood occurs when the channel thickness b is less than $50\mu$.

It is generally possible to manufacture a microporous membrane having a thickness in the range of 50 to $300\mu$ according to the phase separation method. When the thickness is less than $50\mu$, the strength of the membrane is such that the membrane cannot withstand actual use. When the thickness exceeds $300\mu$, the pore distribution becomes sparse, the permeation efficiency is lowered, and the variation in the membrane products is significant. This results in an impractical membrane.

According to the present invention, the membrane for plasma separation has a film thickness of 100 to $300\mu$, preferably $150\pm20\mu$.

The porosity of the microporous membrane for plasma separation according to the present invention is 70 to 90%. The porosity is given by $$\frac{G - W/t}{G} \times 100(\%)$$

where

W: weight (g) of the membrane per unit area ($cm^2$)
t: thickness (cm) of the membrane
G: specific weight ($g/cm^3$) of the membrane
W/t: apparent density ($g/cm^3$)

It is generally possible to manufacture a microporous membrane having a porosity of 40 to 90%. When the porosity exceeds 90%, the strength of the membrane is lowered, so that the membrane may not withstand actual use. When the porosity is less than 40%, problems such as clogging occur, similarly resulting in an impractical membrane.

In the plasma separator according to the present invention, a higher porosity is preferable, as has been described above. However, the tolerance is $80\pm10\%$ considering the manufacturing cost of the membrane.

The material for the microporous membrane must be one which allows the manufacture of the membranes by the phase separation method, preferably has good adhesion and particularly, is capable of heat seal. The material is not particularly limited as long as this condition is satisfied. However, cellulose esters such as cellulose acetate are found to be preferable because they are capable of heat seal and do not cause leukopenia when the blood is circulated through the separator.

The core material to be covered by the membrane is an open screen mesh or a flat member with a rough surface; it preferably has cavities on its surface and inside which are about 10 to 2,000 times the maximum pore size of the porous membrane. When the core material is too dense, the flow resistance increases and interferes with the filtration. Conversely, when the core material is not dense enough, the surrounding membrane may not be supported to be flat. This creates three-dimensional patterns on the surface of the membrane, turbulence of blood flow, and deposition of fibrin and blood cells on the membrane. Therefore, a core material of suitable density must be selected.

When performing the continuous separation treatment with the plasma separator of the present invention while the blood is fed from the body and the filtered blood is returned to the body, the flow rate $Q_B$ of the blood fed from the body is within the range of 50 to 500 ml/min.

It has been found that preferable results are obtained when the pressure drop PD satisfies the relation $0 < PD \leq 0.4$ ($kg/cm^2$) and the shear rate $\dot{\gamma}$ is within the range of 100 to 1,000 $sec^{-1}$ when the blood flow rate is 50 to 500 ml/min.

A plasma separator according to the present invention is manufactured by arranging in a casing, in a single or multilayered form, a membrane unit or membrane units obtained by covering a core material with a microporous membrane satisfying the conditions described above. As an aspect of the present invention, there is proposed a plasma separator of the construction wherein a flow regulating plate or a plate member called a spacer (to be referred to as a spacer for brevity hereinafter) is arranged at a predetermined distance from each membrane unit and parallel thereto, to define a blood channel between each membrane unit and the corresponding spacer. In the case of a plasma separator wherein a number of membrane units are piled in the multilayered form, a spacer is interposed between each pair of membrane units.

The incorporation of the spacers brings about many advantages. For example, the channel thickness of each blood channel is made uniform, the filtering efficiency is improved, channeling is prevented, and hemolysis at local parts where the blood flow is slow or stopped is minimized.

When the blood channel is defined between a pair of membrane units without incorporation of the spacer, the preferable channel thickness is as narrow as 50 to $150\mu$. In addition, since the surfaces of the respective membrane units are rough, the channel defined between the membrane units may be further narrowed or locally closed, depending upon the manner in which opposing membrane units are piled. The flow of blood stops at this place, leading to the channeling phenomenon, undesirable hemolysis, and a drop in the filtering efficiency.

Therefore, by incorporating a spacer between opposing membrane units, these problems may be completely solved.

The material for the spacer is preferably a hard or semihard synthetic resin such as polycarbonate, polypropylene, polyester, methylmethacrylate, or styrol. The thickness of the spacer is preferably $400\mu$ to 5 mm, especially about $500\mu$, considering the requirement for a smaller plasma separator. These spacers are formed in substantially the same shape as those of the membrane units so as to have substantially the same surface areas.

The term "$\mu$" used herein is the abbreviation for "micron", sometimes also abbreviated as "$\mu m$".

DETAILED DESCRIPTION OF THE PREFERRED EMBODIMENTS

Figure 1A:
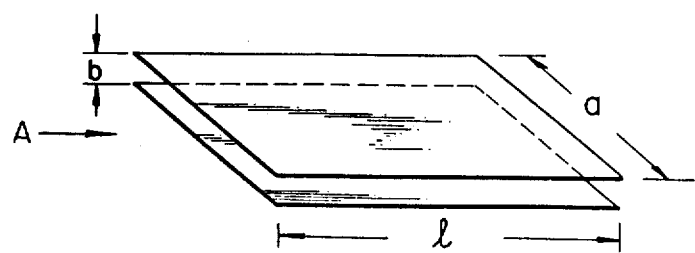
FIGS. 1(a) and 1(b) are schematic views for explaining the various requirements for the blood channel.
Figure 1B:
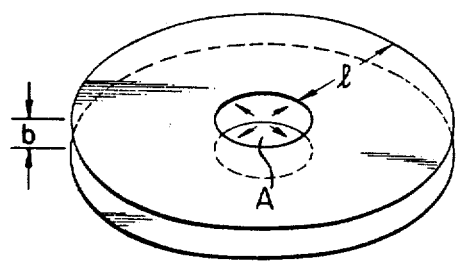
Figure 2:
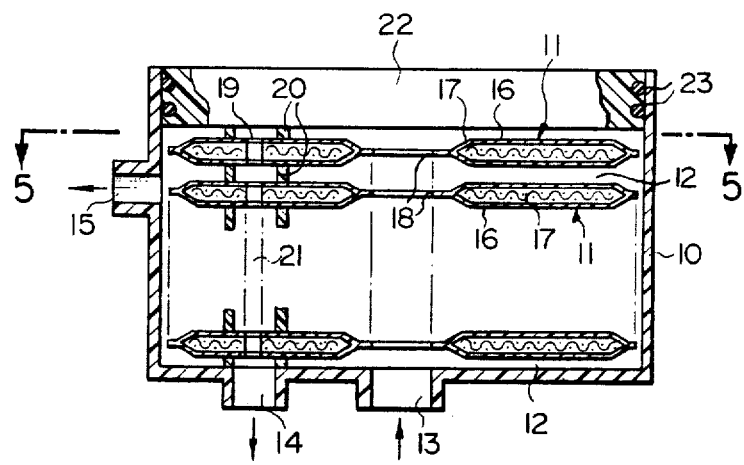
FIGS. 2, 3 and 4 are vertical sectional views of respective embodiments of the plasma separator of the present invention.

In a plasma separator according to the present invention shown in FIG. 2, a number of disk-shaped membrane units 11 are piled inside a cylindrical casing 10, defining a blood channel 12 between each pair of membrane units.

The casing 10 is formed by injection molding of a hard resin such as polycarbonate and an acrylic resin to have, for example, an inner diameter of 150 mm and an outer diameter of 160 mm. The casing 10 has, at central part of its bottom, a blood inlet port 13 communicating with a blood feed tube and, at part shifted from the center of its bottom, a filtrate outlet port 14 communicating with a plasma discharge tube. At the side wall of the casing 10 is formed a blood outlet port 15 to which is connected a blood cells tube.

Inside the casing 10 are piled 10 to 30 membrane units 11 to provide an effective membrane area of 3,000 to 10,000 cm$^2$. A microporous membrane 16 of the membrane unit 11 is manufactured by the phase separation method. A pair of such microporous membranes cover both surfaces of a core matetial 17, and the peripheries of these membranes are heat-sealed to cover the overall surface of the core material 17.

In this embodiment, the core material 17 is in mesh form. The core material comprises, for example, an open screen mesh having a filament diameter of 100 to 600$\mu$ and a mesh of 10 to 100/inch. The pitch of the protruding part of the mesh core material is preferably 100 to 400$\mu$, and the thickness of the mesh material is preferably 200 to 1200$\mu$.

Figure 5:
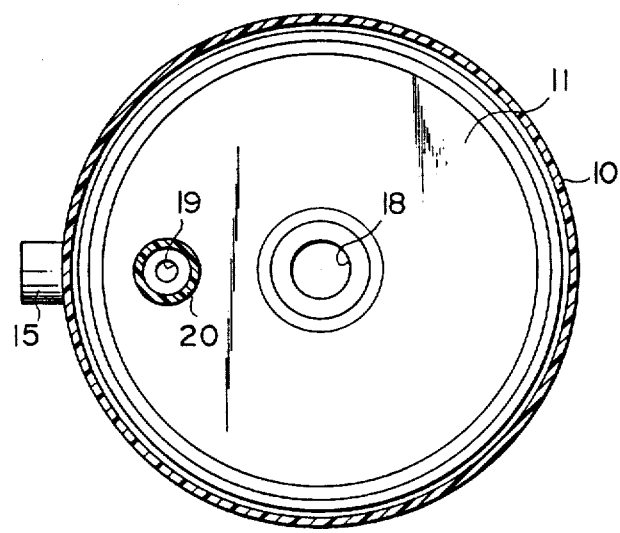
FIG. 5 is a sectional view along the line 5—5 of FIG. 2.

A blood feed hole 18 communicating with the blood inlet port 13 is formed at the center of each of the membrane units 11, as may be seen from FIG. 5. A filtrate discharge hole 19 communicating with the filtrate outlet port 14 is formed in each of the membrane units 11 shifted from the center thereof.

Annular packings 20 are attached around the filtrate discharge hole 19 of each of the membrane units 11. These packings form a plasma discharge channel 21 which is separated from the external blood channels. The channel 21 communicates with the filtrate outlet port 14.

The packing 20 is preferably made of a silicone rubber or a hotmelt type adhesive, with a thickness of 50 to 1,000$\mu$.

The upper opening of the casing 10 is closed by a lid 22 of the same material as that of the casing. Two O-rings 23 engaging with the inner circumferential surface of the casing 10 are fitted around the outer circumferential surface of the lid. By these O-rings of the slidable lid 22, the casing 10 is kept water-tight. Each of the O-rings 23 is preferably made of a silicone rubber having a Shore A hardness of about 30 to 50.

Figure 3:
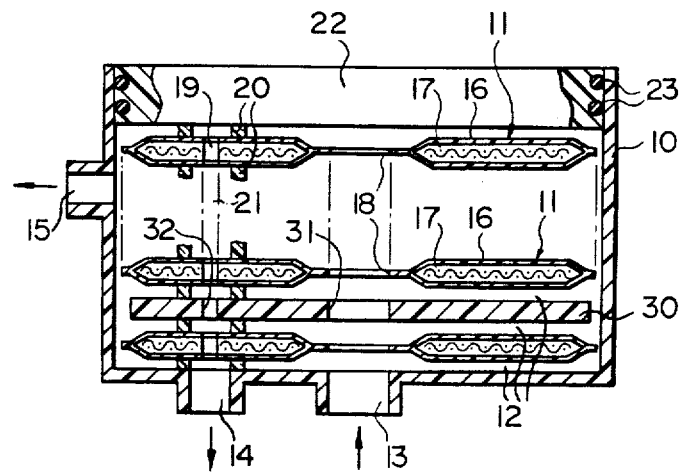

In a plasma separator according to another embodiment of the present invention shown in FIG. 3, a large number of the membrane units 11 of the same construction as in the embodiment shown in FIG. 2 are piled inside the cylindrical casing 10. Between each pair of these membrane units, however, a plate-shaped spacer 30 is arranged at a distance and parallel to each membrane unit. Each spacer 30 with the adjacent upper and lower membrane units 11 defines a uniform blood channel 12.

As in the case of the membrane units, a blood feed hole 31 is formed at the center of each of the spacers 30, and a filtrate discharge hole 32 is formed at a part shifted from the center of the spacer. The filtrate discharge hole 32 is located within the plasma discharge channel 21.

Since the other parts of this embodiment are the same as those of the embodiment shown in FIG. 2, the same reference numerals are used to denote these parts, and the detailed description thereof will be omitted.

In this embodiment, due to the presence of the spacers 30, the blood channels 12 defined by the uppermost and lowermost membrane units and by the intermediate membrane units are under the same environmental condition. Therefore, the blood channels are made uniform, facilitating the prevention of the undesirable channeling phenomenon.

Figure 4:
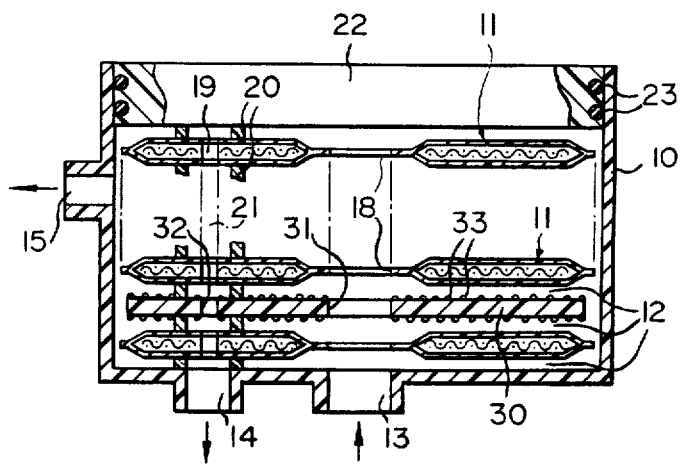

A plasma separator according to still another embodiment of the present invention is shown in FIG. 4; it is of a similar construction to that of the embodiment shown in FIG. 3, except that a number of small projections 33 are formed integrally with both the surfaces of the spacers 30. Therefore, the outer surface of each spacer is rough. The formation of these small projections eliminates expansion and deformation of the membrane units 11 due to swelling, and provides a uniform channel thickness. Since the other parts of this embodiment are the same as those of the embodiment shown in FIG. 2, the same reference numerals are used to denote these parts and the detailed description thereof will be omitted.

In the plasma separators of the embodiments shown in FIGS. 2 to 4, the shear rate of the blood flowing through the blood channels was set in the range of 100 to 1,000 sec$^{-1}$. The shear rate has been set within this range to eliminate hemolysis and the decrease in the plasma filtration rate with time, thus providing a desired plasma filtration rate.

When the shear rate is less than 100 sec$^{-1}$, a sufficient plasma filtration rate may not be obtained and hemolysis tends to occur. When the shear rate exceeds 1,000 sec$^{-1}$, the decrease in the plasma filtration rate with time is significant and the plasma filtration rate is saturated to reach the limit. Thus, the effect of making the shear rate higher is lost and the blood tends to coagulate.

When the shear rate is within the range as defined above, the preferable values of other conditions were found to be as follows: 50 to 150$\mu$ (channel thickness), 50 to 500 ml/min (blood flow rate), and $0 < PD \leq 0.4$ kg/cm$^2$ (pressure drop PD).

The channel thickness is preferably small so as to achieve a good plasma filtration rate. However, when the channel thickness is too small, the error becomes significant, resulting in various problems of hemolysis due to channeling, blocking of the channel due to coagulation, and so on. In the three embodiments described above, the pressing force of the lid 22 is controlled to vary the pressure drop according to which in turn, the channel thickness is controlled.

When the blood flow rate is greater, the plasma filtration rate becomes greater. However, since the rate at which blood may be taken from the body is limited, the blood flow rate is limited to the rate defined above.

When the pressure drop is higher, the plasma filtration rate may be made slightly higher. However, when the pressure drop exceeds 0.4 kg/cm$^2$, excessive hemolysis occurs.

Under the same shear rate condition, a smaller pressure drop is preferable. Therefore, a smaller channel thickness and a smaller channel length are preferable. For example, the channel length is most preferably in the range of 4 to 10 cm.

In FIGS. 2 to 4, the blood channel 12 is shown in a magnified fashion for the sake of convenience. In the actual device, the membrane units 11 and the spacer 30 are disposed so close to each other that adjacent membrane units 11 are nearly in mutual contact; the spacer 30 and the adjacent membrane units 11 are also nearly in mutual contact.

Figure 6:
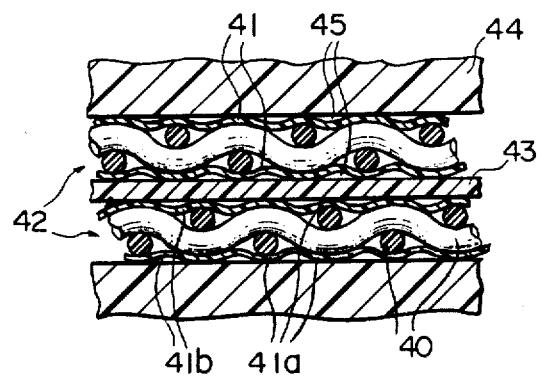
FIG. 6 is a partial vertical sectional view of a modification of the embodiment shown in FIG. 3.
Figure 7:
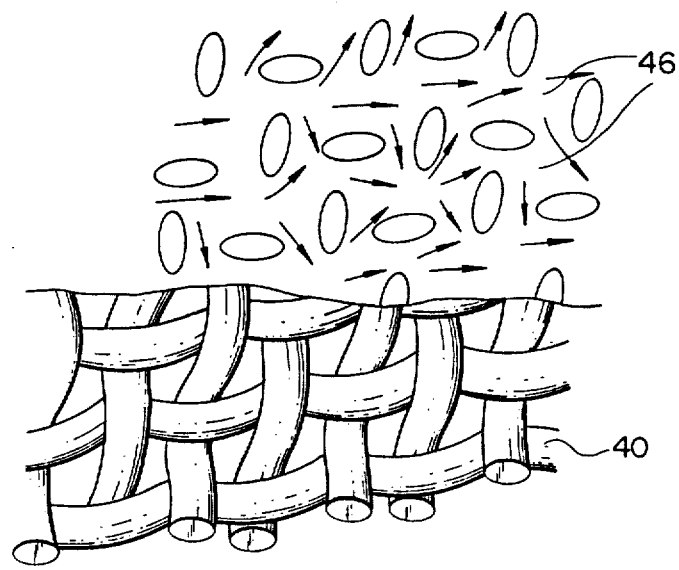
FIG. 7 is a view showing the manner in which blood flows within the blood channel, and the meshed construction of the core material as separated into upper and lower parts.

FIG. 6 partially shows the plasma separator of the same construction as that of the embodiment shown in FIG. 3. In this plasma separator, a pair of membrane units 42, each consisting of an inner mesh core material 40 and microporous membrane 41 housing this core material, sandwich a spacer 43 and are tightly held by a casing 44 from both the upper and lower sides. In this plasma separator, each of blood channels 45 thus has a small channel thickness. Projections 41a on the outer surface of the microporous membrane 41 tend to be pressed against the opposing surface of the spacer 43 or the wall surface of the casing. However, due to the presence of the spacer 43, in each of the channels 45, recesses 41b in the surface of the membrane unit form spaces 46 with the surface of the spacer or with the wall surface of the casing. Since these spaces are continuous, as shown at the upper part of FIG. 7, the blood flows smoothly as shown by the arrows, without stoppage.

Figure 8:
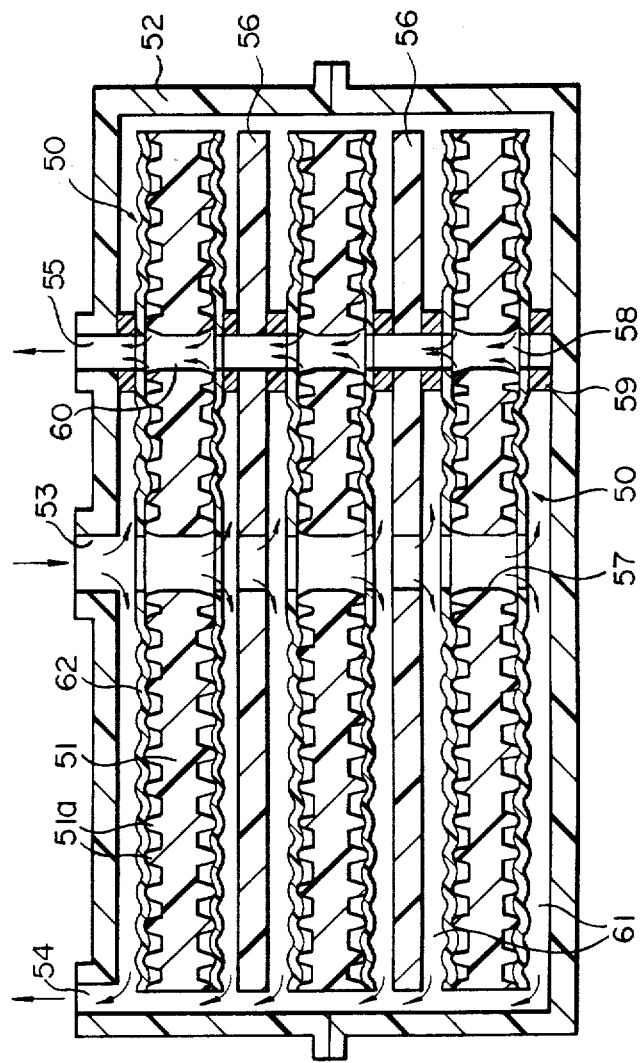
FIG. 8 is an enlarged vertical sectional view showing another modification of the embodiment shown in FIG. 3.

FIG. 8 shows still another embodiment of the plasma separator of the present invention. This separator is of the type which has spacers as in the case of the embodiment shown in FIG. 3. As in FIGS. 2 to 4, the blood channel is shown in a magnified fashion in FIG. 8. However, a core material 51 of each membrane unit 50 is not of mesh type, but is of plate type having a rough outer surface; a number of projections 51a are formed on both surfaces of the core material 51. The core material 51 is covered by microporous membranes 62.

A blood inlet port 53 is formed at the top center of a cylindrical casing 52. A blood outlet port 54 is formed in the vicinity of the outer periphery of the casing 52. A filtrate outlet port 55 for discharging plasma is formed at a part shifted from the top center of the casing 52.

The membrane units 50 and spacers 56 piled in the casing 52 are in circular form. In each of these membrane units 50 and the spacers 56 are formed a blood feed hole 57 corresponding to the blood inlet port 53, and a filtrate discharge hole 58 corresponding to the outlet port 55. Packings 59 are arranged to separate the discharge holes of the spacers and the membrane units, thus defining a plasma discharge channel 60 communicating with the filtrate outlet port 55.

The plate-shaped core material 51 is made of a synthetic resin such as polypropylene, polyester, nylon, or polyethylene. The pitch of the projections 51a is preferably about 0.2 to 2.0 mm, and the height of the projections is preferably about 0.08 to 0.5 mm.

The spacer 56 is made of a hard or semihard synthetic resin such as polycarbonate, polypropylene, polyester, methylmethacrylate, or styrol. The thickness of the spacer 56 is preferably 400μ to 5 mm, especially about 500μ.

Blood channels 61 are formed between the membrane units 50 and the opposing spacers 56 and the wall surfaces of the casing 52.

Figure 9:
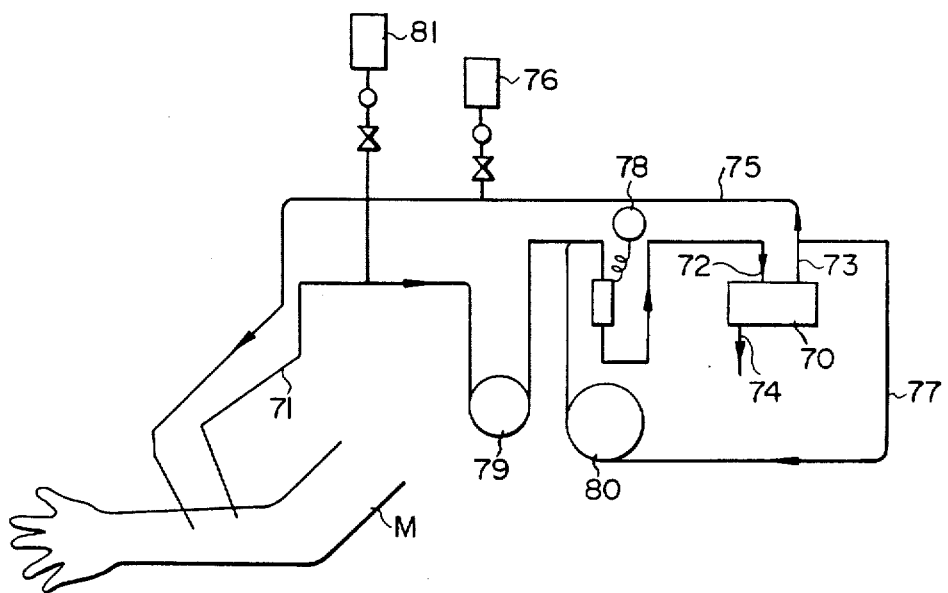
FIG. 9 is a schematic view showing a system which incorporates the plasma separator of the present invention.

FIG. 9 schematically shows a system which uses a plasma separator according to the present invention and which continuously takes blood from a body M and performs separation treatment.

Blood is fed from body M to a system 70 from a blood inlet port 72 via an inlet line 71. The system separates the plasma components from the blood cells components. The filtered plasma components are discharged filtrate outlet port 74 and fed to a plasma collection bag (not shown), for example. The unfiltered blood is supplied through a flood outlet port 73 to an outlet line 75 and is then supplemented by fresh fluid from a feed bag 76, to be returned to the body M. Also, part of the blood with the cells components may be divided from the outlet line 75 to a bypass line 77 and then supplied again to the system 70 through the inlet line 71 so as to increase the blood flow rate and the plasma filtration rate.

In FIG. 9, reference numeral 78 denotes a pressure meter; 79 and 80, blood feed pumps; and 81, a feed bag for feeding an anticoagulant such as heparin or ACD to the inlet line 71.

In the various embodiments of the present invention as described above, desirable plasma separation treatment was accomplished. This effect is obtained by setting to particular values, as has been described hereinabove, the channel thickness, and the pore size, the porosity and the thickness of the microporous membranes manufactured by the phase separation method. According to the plasma separator of the present invention, hemolysis and coagulation rarely occur, the drop in the plasma filtration rate with time is small, and a sufficient plasma filtration rate may be obtained during the separation treatment.

Figure 10:
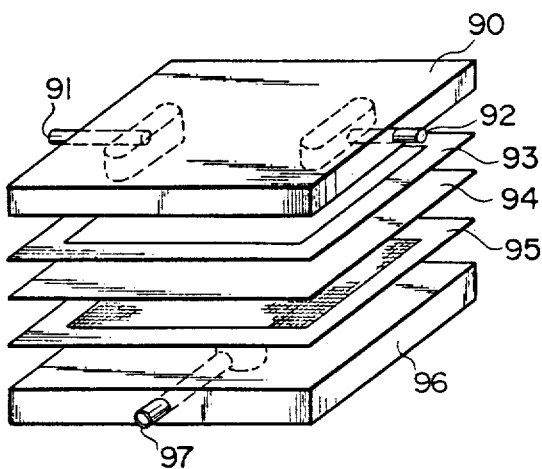
FIG. 10 is an exploded perspective view of the plasma separator according to the present invention for experimental purposes.

These facts have been confirmed by an experimental plasma separator shown as exploded in FIG. 10.

The experimental plasma separator in FIG. 10 has an upper plate 90 with a blood inlet port 91 and a blood outlet port 92, a gasket 93, a microporous membrane 94, a membrane support 95, and an under plate 96 with a plasma outlet port 97. These rectangular elements are densely piled, one upon the other.

The present invention will now be described by way of its examples.

EXAMPLE 1

The permeability for each of albumin and total protein was measured with the separator shown in FIG. 10. The obtained results are shown as Nos. 1 to 4 in Table 1, together with the results obtained with No. 5, the prior art separator.

TABLE 1

| | Material of filter membrane | Pore size ($\mu$) | Permeability of albumin (%) | Permeability of total protein (%) |
|---|---|---|---|---|
| Present invention | | | | |
| No. 1 | Nitrocellulose | 0.1 | 90.6 | 97.9 |
| No. 2 | Nitrocellulose | 0.2 | 88.0 | 95.1 |
| No. 3 | Nitrocellulose | 0.45 | 92.4 | 97.9 |
| No. 4 | Nitrocellulose | 0.60 | 93.5 | 97.6 |
| Prior art | | | | |
| No. 5 | Polycarbonate | 0.60 | 89.4 | 94.7 |

In this example, the channel thickness was 400$\mu$, the blood flow rate was 30 ml/min, the shear rate was 417 sec$^{-1}$, and the pressure drop was 0.04 kg/cm$^2$.

No. 5 is a prior art example wherein a neuclipore membrane manufactured by irradiating polycarbonate with neutrons was used. As may be seen from the results obtained, the microporous membranes of nitrocellulose of Nos. 1 to 4 according to the present invention exhibited permeability comparable to that obtained with the prior art membrane.

EXAMPLE 2

Figure 12:
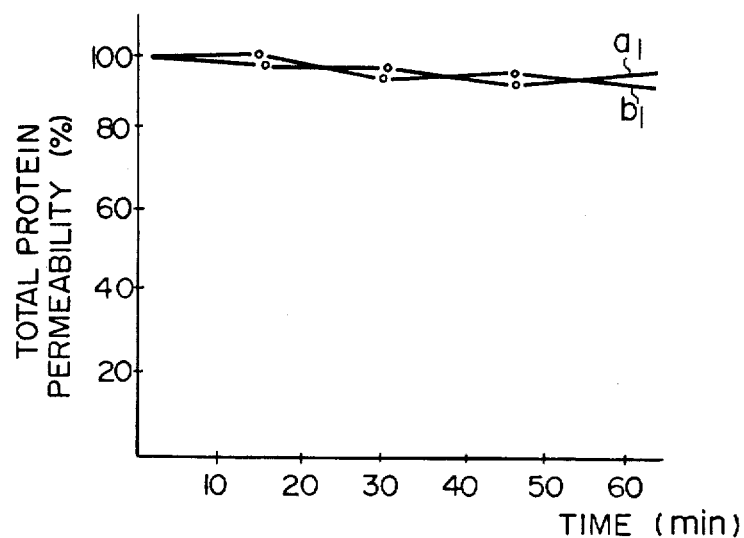
FIGS. 12 to 15 are graphs showing the experimental data obtained with the present invention and those with the comparative examples of the prior art.

The change in the permeability of total protein was measured using the membrane of No. 3 in Example 1. The obtained results are shown the graph in FIG. 12 together with the results obtained with the prior art membrane of No. 5 in Example 1. Curve $a_1$ shows the results according to the present invention and curve $b_1$ shows the results obtained according to the prior art. With curve $a_1$, a drop of 5% of the permeability was observed after 60 minutes. With curve $b_1$, a drop of 7% was observed after the same length of time. It is thus seen from this result that the change in the permeability with time is not drastically different between the present invention and the prior art.

In this example, the channel thickness was 300$\mu$, the blood flow rate was 20$\mu$m/min, the shear rate was 493 sec$^{-1}$, and the pressure drop was 0.006 kg/cm$^2$.

EXAMPLE 3

Figure 13:
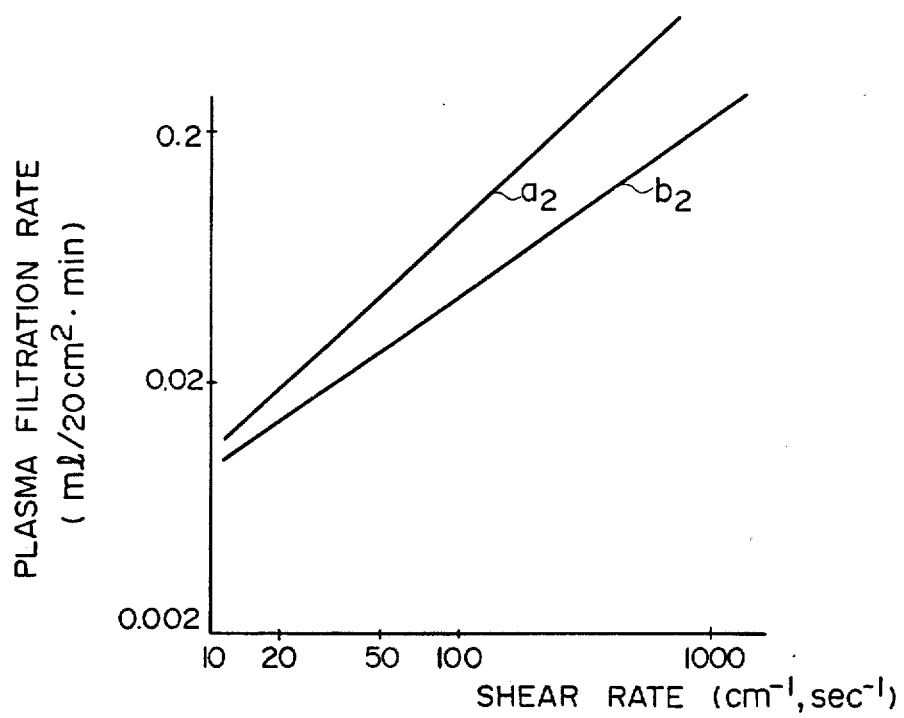

The shear rate and the plasma filtration rate were measured using the microporous membrane of No. 3 of Example 1, and the obtained results are shown by curve $a_2$ in FIG. 13. In this example, the channel thickness was 100 to 500$\mu$, the blood flow rate was 10 to 100 ml/min, and the pressure drop was 0.001 to 0.1 kg/cm$^2$.

The results obtained with the prior art membrane No. 5 of Example 1 is shown by curve $b_2$ in FIG. 13.

It is seen from FIG. 13 that a better plasma filtration rate may be obtained by raising the shear rate with the microporous membrane of No. 3 as compared with the prior art membrane. In order to obtain a required plasma filtration rate (about 0.01 ml/cm$^2$ per minute), a shear rate of above 100 sec$^{-1}$ per unit length of the channel is required. When the shear rate exceeds 1000 sec$^{-1}$, the plasma filtration rate is saturated. Therefore, it is seen that the suitable range for the shear rate per unit length of channel is 100 to 1,000 sec$^{-1}$.

EXAMPLE 4

The change in the plasma filtration rate with time per unit area of the membrane was measured using the microporous membrane of No. 3 in Example 1. The obtained results are shown by curve $a_3$ in FIG. 14 and by curve $a_4$ in FIG. 15.

For the case of curve $a_3$, the channel thickness was 300$\mu$, the blood flow rate was 4 ml/min (constant), the shear rate was about 100 sec$^{-1}$ and the pressure drop was 0.05 to 0.19 kg/cm$^2$ With this curve, a drop of 15% in the plasma filtration rate was observed after 60 minutes.

For the case of curve $a_4$, the channel thickness was 300$\mu$, the blood flow rate was about 34 ml/min to keep the pressure drop constant, the shear rate was 833 sec$^{-1}$, and the pressure drop of 2.5% in the plasma filtration rate was observed after 60 minutes.

Figure 14:
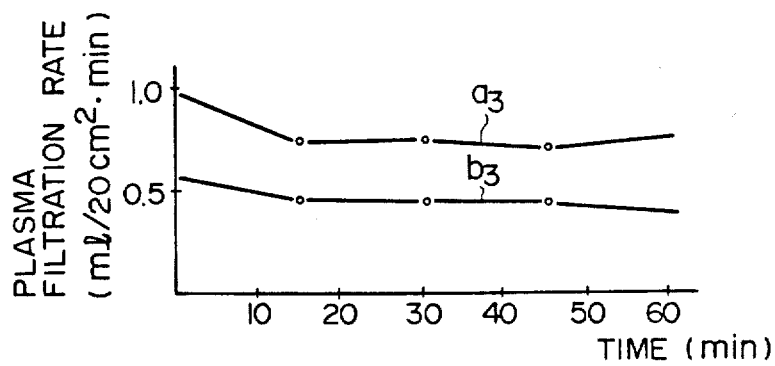
Figure 15:
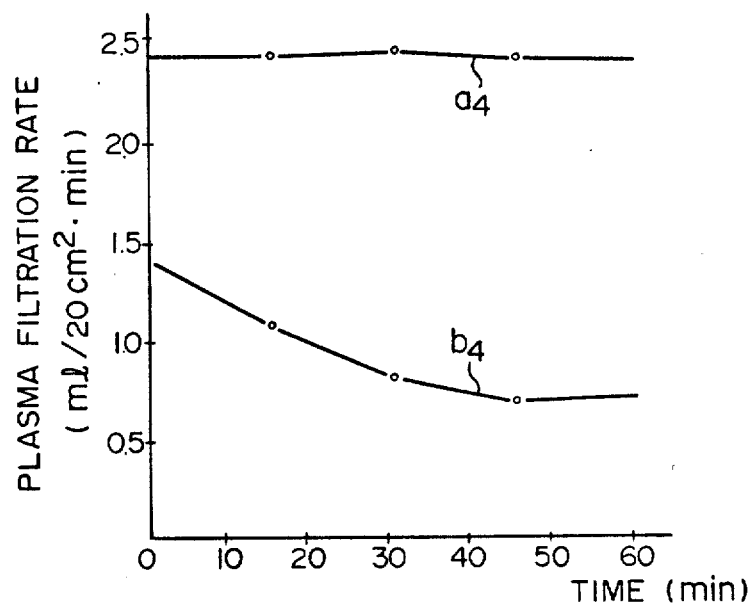

A comparative example using the No. 5 prior art membrane is shown as curve $b_3$ in FIG. 14 and curve $b_4$ in FIG. 15.

For the case of curve $b_3$, the channel thickness was 300$\mu$, the blood flow rate was 8 ml/min (constant), the shear rate was about 200 sec$^{-1}$, and the pressure drop was controlled within the range of 0.06 to 0.34 kg/cm$^2$ to keep the blood flow rate constant. After an elapse of 60 minutes, a drop of 36% in the plasma filtration rate was observed. For the case of curve $b_4$, the channel thickness was 300$\mu$, the blood flow rate was kept to be 34 ml/min to keep the pressure drop constant, the shear rate per unit length of the channel was 833 sec$^{-1}$, and the pressure drop was 0.1 kg/cm$^2$ (constant). A drop of 40% in the plasma filtration rate was observed after 60 minutes.

It is seen from FIGS. 14 and 15 that, with the microporous membrane of No. 3, the decrease in the plasma filtration rate with time is small regardless of whether the shear rate is great or small. In contract with this, with the membrane of No. 5, when the shear rate per unit length of the channel is small, the decrease in the plasma filtration rate with time is small. However, when the shear rate is great, the decrease in the plasma filtration rate with time is significant. It may be concluded from this that the microporous membrane satisfying the various conditions according to the present invention exhibits excellent filtering characteristics, regardless of a small or great shear rate. Accordingly, when the shear rate is great, a stable plasma filtration rate may be obtained without significat decrease over time with the microporous membrane of the present invention as contrasted with the prior art membrane.

EXAMPLE 5

The relationship between the pressure drop and the hemoglobin concentration was examined so as to determine the critical pressure drop on the assumption that hemolysis occurred when the hemoglobin concentration exceeded 50 mg/dl, with the results as shown in Table 2. The allowable upper limit of the hemoglobin concentration is thought to be about 100 mg/dl from the medical stand point. But, the value of 50 mg/dl mentioned above was employed as the practical safety limit.

TABLE 2

| Shear rate (sec$^{-1}$) | Critical pressure drop (kg/cm$^2$) |
|---|---|
| 100 | 0.15 |
| 500 | 0.25 |
| 1000 | 0.35 |

In this example, the channel thickness was 400$\mu$ and the blood flow rate was 7 to 70 ml/min.

Figure 11:
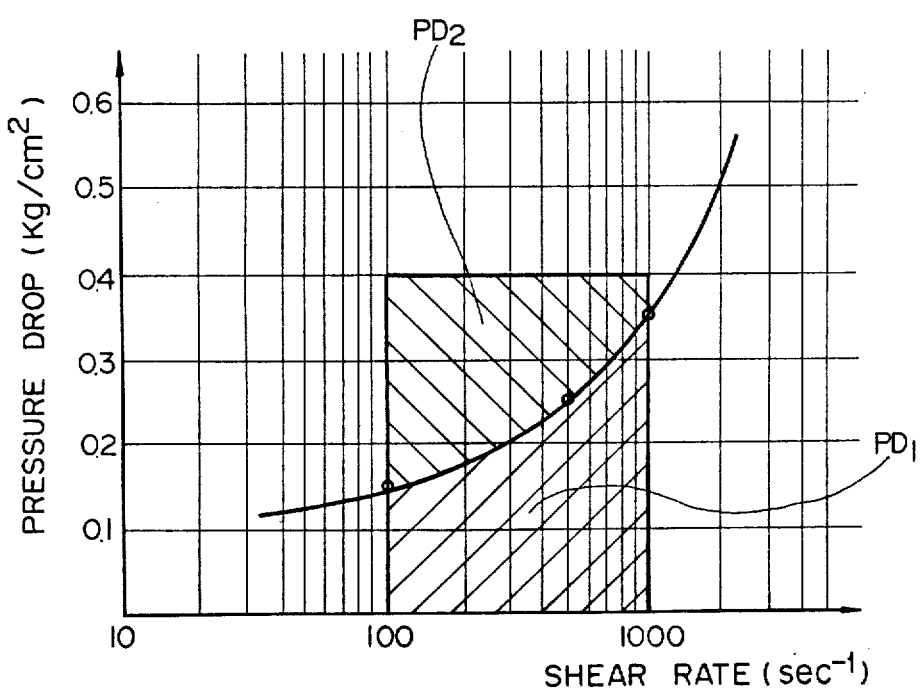
FIG. 11 is a graph showing the relationship between the shear rate and the pressure drop.

This data is shown in a graph in FIG. 11. Therefore, it is seen that the pressure drop PD is preferably within the range of 0<PD≦0.4 (kg/cm$^2$). Hatched area PD$_1$ is the optimum range for the pressure drop, and area PD$_2$ is the allowable range.

The results obtained in the examples described above were obtained by experimentation on a smaller scale than the actual plasma separator, in terms of the size of the filter membranes, the blood flow rates, and other related values. However, similar effects as with the small-scale experiments are obtained when the scale is made greater. This will be described hereinafter.

In an example of the small-scale experiments, the channel width is represented by a; the channel thickness, by b; the channel length, by l, and the blood flow rate, by q. In contrast with this, in the actual module, the number of piled membrane units is represented by N; the channel width, by A; the channel thickness, by B; the channel legnth, by L; and the blood flow rate, by Q. Then, the following relations hold:

$$A = a \times N, \ B = b, \ L = l, \ Q = q \times N$$

In the example, the shear rate $\dot{\gamma} = 6q/ab^2$ and the pressure drop $p = 12q\mu l/ab^3$.

Therefore, we obtain $$\dot{\gamma} = 6q/ab^2 = 6Nq/aNb^2 = 6Q/AB^2$$

$$p = 12q\mu l/ab^3 = 12Nq\mu l/aNb^3 = 12Q\mu L/AB^3$$

These final results obtained are equal to the shear rate and the pressure drop of the scaled-up module.

It is seen, therefore, that similar results as obtainable with the example of small scale are obtainable with the scaled-up actual module.

When the plasma separator satisfying the various requirements about the microporous membranes and blood channels as confirmed by the examples is used, a desired plasma filtration rate may be continuously obtained without causing hemolysis and other problems, the operation may be easy, and danger of contamination of the blood is also small. Furthermore, as shown in FIGS. 2 to 4, the plasma separator of the present invention may be made compact in size, and the shear rate may be easily increased by making the channel thickness smaller. Even when the shear rate is increased, the decrease in the plasma filtration rate with time is small. Therefore, it is easy to set the pressure as small as possible by increasing the shear rate, and it is easy to prevent hemolysis.

When the plate-shaped spacers are interposed between two pairs of opposing membrane units, stoppage of the blood flow is prevented and the undesirable channeling does not occur. Therefore, a higher filtering efficiency may be obtained, and hemolysis may be prevented.

Table 3 below shows the examples described above, examples satisfying the various requirements of the present invention using the microporous membrane, and comparative examples which do not satisfy these requirements. These experiments were also conducted on the small scale.

TABLE 3

| | Microporous membrane | | Effective membrane area S(cm²) | Blood channel | | | | Core material | | | Shear rate γ(sec⁻¹) | Pressure drop PD(kg/cm²) | Critical pressure drop for hemolysis PD*(kg/cm²) | Plasma filtration rate Q_F(ml/min) | Filtering efficiency E (%) | Plasma filtration rate per unit area of membrane Q_F/S(ml/m²) | Rate of change of free hemoglobin concentration by hemolysis ΔHb(mg/dl) |
|---|---|---|---|---|---|---|---|---|---|---|---|---|---|---|---|---|---|
| | Material | Number in pile | | Channel width a(cm) | Channel length l(cm) | Channel thickness b(μ) | Blood flow rate Q_B(ml/min) | Mesh inch⁻¹ | Filament diameter μ | | | | | | | | |

Examples of present invention

| # | Material | Number in pile | Effective membrane area S(cm²) | Channel width a(cm) | Channel length l(cm) | Channel thickness b(μ) | Blood flow rate Q_B(ml/min) | Mesh inch⁻¹ | Filament diameter μ | Shear rate γ(sec⁻¹) | Pressure drop PD(kg/cm²) | Critical pressure drop PD*(kg/cm²) | Plasma filtration rate Q_F(ml/min) | Filtering efficiency E (%) | Q_F/S(ml/m²) | ΔHb(mg/dl) |
|---|---|---|---|---|---|---|---|---|---|---|---|---|---|---|---|---|
| 1 | 0.45μ Cellulose acetate | 20 | 2936 | 800 | 3.67 | 100 | 50 | 40 | 200 | 111 | 0.032 | 0.15 | 18 | 60.0 | 61.3 | 23.4 |
| 2 | | 20 | 2936 | 800 | 3.67 | 100 | 100 | 40 | 200 | 222 | 0.065 | 0.18 | 31 | 51.7 | 105.6 | 18.2 |
| 3 | | 20 | 2936 | 800 | 3.67 | 100 | 200 | 40 | 200 | 445 | 0.130 | 0.24 | 53 | 44.2 | 180.5 | 41.6 |
| 4 | | 20 | 2936 | 800 | 3.67 | 150 | 300 | 60 | 150 | 297 | 0.057 | 0.20 | 39 | 21.7 | 132.8 | 20.3 |
| 5 | | 20 | 2936 | 800 | 3.67 | 150 | 400 | 60 | 150 | 396 | 0.077 | 0.22 | 49 | 20.4 | 166.9 | 8.6 |
| 6 | | 40 | 5847 | 800 | 7.34 | 100 | 100 | 40 | 200 | 111 | 0.032 | 0.15 | 36 | 60.0 | 61.6 | 11.2 |
| 7 | | 40 | 5847 | 800 | 7.34 | 100 | 200 | 40 | 200 | 222 | 0.065 | 0.18 | 62 | 51.7 | 106.0 | 36.0 |
| 8 | | 40 | 5847 | 800 | 7.34 | 100 | 300 | 40 | 200 | 334 | 0.097 | 0.21 | 86 | 47.8 | 147.1 | 42.8 |
| 9 | | 40 | 5847 | 800 | 7.34 | 100 | 400 | 40 | 200 | 445 | 0.130 | 0.24 | 107 | 44.6 | 183.0 | 56.4 |
| 10 | | 20 | 2800 | 800 | 3.5 | 50 | 50 | 70 | 200 | 250 | 0.096 | 0.20 | 28.0 | 93.3 | 100.0 | 41.2 |
| 11 | | 20 | 2800 | 800 | 3.5 | 50 | 100 | 70 | 200 | 500 | 0.190 | 0.25 | 53.4 | 89.0 | 190.7 | 43.1 |
| 12 | | 20 | 2800 | 800 | 3.5 | 80 | 100 | 70 | 200 | 195 | 0.050 | 0.18 | 26.5 | 44.2 | 94.6 | 31.0 |
| 13 | | 20 | 2800 | 800 | 3.5 | 80 | 200 | 70 | 200 | 390 | 0.091 | 0.23 | 45.5 | 37.9 | 135.4 | 33.2 |
| 14 | | 40 | 5600 | 800 | 3.5 | 150 | 200 | 70 | 200 | 111 | 0.010 | 0.15 | 17.0 | 14.2 | 60.7 | 9.4 |
| 15 | | 40 | 5600 | 800 | 3.5 | 150 | 400 | 70 | 200 | 222 | 0.028 | 0.18 | 29.3 | 12.2 | 104.6 | 10.3 |
| 16 | | 40 | 5600 | 800 | 7.5 | 50 | 50 | 70 | 200 | 250 | 0.190 | 0.21 | 26.0 | 86.7 | 154.8 | 48.2 |
| 17 | | 40 | 5600 | 800 | 7.5 | 80 | 200 | 70 | 200 | 195 | 0.093 | 0.18 | 49.0 | 81.7 | 87.5 | 30.1 |
| 18 | | 40 | 5600 | 800 | 7.5 | 80 | 400 | 70 | 200 | 390 | 0.187 | 0.23 | 91.0 | 75.8 | 162.5 | 43.2 |
| 19 | | 40 | 5600 | 800 | 7.5 | 150 | 200 | 70 | 200 | 111 | 0.028 | 0.15 | 34.1 | 28.3 | 60.9 | 13.6 |
| 20 | | 40 | 5600 | 800 | 7.5 | 150 | 400 | 70 | 200 | 222 | 0.058 | 0.18 | 58.7 | 24.5 | 104.8 | 15.4 |
| 21 | | 20 | 2760 | 1600 | 1.7 | 50 | 300 | 70 | 200 | 750 | 0.141 | 0.29 | 93.5 | 51.9 | 188.0 | 48.3 |
| 22 | | 20 | 2760 | 1600 | 1.7 | 50 | 400 | 70 | 200 | 1000 | 0.189 | 0.35 | 74.7 | 31.1 | 112.7 | 61.2 |
| 23 | | 20 | 2800 | 800 | 3.5 | 50 | 200 | 70 | 200 | 1000 | 0.382 | 0.35 | 94.8 | 79.0 | 282.1 | 78.6 |
| 24 | | 40 | 5600 | 800 | 7.0 | 80 | 400 | 70 | 200 | 780 | 0.374 | 0.35 | 81.0 | 33.8 | 60.3 | 102.2 |

Comparative examples

| # | Material | Number in pile | Effective membrane area S(cm²) | Channel width a(cm) | Channel length l(cm) | Channel thickness b(μ) | Blood flow rate Q_B(ml/min) | Mesh inch⁻¹ | Filament diameter μ | Shear rate γ(sec⁻¹) | Pressure drop PD(kg/cm²) | Critical pressure drop PD*(kg/cm²) | Plasma filtration rate Q_F(ml/min) | Filtering efficiency E (%) | Q_F/S(ml/m²) | ΔHb(mg/dl) |
|---|---|---|---|---|---|---|---|---|---|---|---|---|---|---|---|---|
| 1 | 0.45μ Cellulose acetate | 20 | 2800 | 800 | 3.5 | 30 | 50 | 70 | 200 | 694 | 0.444 | 0.28 | 1.6 | 5.3 | 5.7 | 165.2 |
| 2 | | 20 | 2800 | 800 | 3.5 | 30 | 100 | 70 | 200 | 1388 | 0.889 | 0.43 | 3.1 | 5.2 | 11.0 | 273.1 |
| 3 | | 20 | 2800 | 800 | 3.5 | 30 | 150 | 70 | 200 | 2083 | 1.333 | 0.54 | 3.7 | 4.1 | 13.2 | 328.2 |
| 4 | | 20 | 2800 | 800 | 3.5 | 250 | 300 | 70 | 200 | 4166 | 2.667 | 0.65 | 4.2 | 2.3 | 15.0 | 571.1 |
| 5 | | 20 | 2800 | 800 | 3.5 | 250 | 100 | 70 | 200 | 20 | 0.001 | 0.09 | 4.4 | 7.3 | 15.7 | 8.6 |
| 6 | | 20 | 2800 | 800 | 3.5 | 250 | 200 | 70 | 200 | 40 | 0.003 | 0.11 | 7.7 | 6.4 | 27.5 | 9.1 |
| 7 | | 40 | 5600 | 800 | 7.0 | 250 | 400 | 70 | 200 | 80 | 0.006 | 0.14 | 13.2 | 5.5 | 47.1 | 11.1 |
| 8 | | 40 | 5600 | 800 | 7.0 | 40 | 50 | 70 | 200 | 390 | 0.375 | 0.25 | 2.2 | 7.3 | 3.9 | 91.9 |
| 9 | | 40 | 5600 | 800 | 7.0 | 40 | 100 | 70 | 200 | 781 | 0.750 | 0.30 | 4.0 | 6.7 | 7.1 | 319.2 |
| 10 | | 40 | 5600 | 800 | 7.0 | 40 | 200 | 70 | 200 | 1562 | 1.500 | 0.44 | 4.1 | 3.4 | 7.3 | 498.9 |
| 11 | | 40 | 5600 | 800 | 7.0 | 250 | 50 | 70 | 200 | 10 | 0.001 | 0.08 | 5.2 | 17.3 | 9.2 | 3.2 |
| 12 | | 40 | 5600 | 800 | 7.0 | 250 | 100 | 70 | 200 | 20 | 0.003 | 0.09 | 8.9 | 14.8 | 15.9 | 6.6 |
| 13 | | 40 | 5600 | 800 | 7.0 | 250 | 200 | 70 | 200 | 40 | 0.006 | 0.11 | 15.4 | 12.8 | 27.5 | 13.4 |
| 14 | | 40 | 5600 | 800 | 7.0 | 250 | 400 | 70 | 200 | 80 | 0.012 | 0.14 | 26.4 | 11.0 | 47.1 | 21.0 |

Note:
It is assumed that the ΔHb concentration does not exceed the critical value of 100 to 150 mg/dl, preferably, 50 mg/dl. The pressure drop PD* is the value when the ΔHb concentration does not exceed 50 mg/dl.

In Table 3, the filtering efficiency (E) represents the ratio of the plasma content which is filtered out to the total plasma in a unit volume of the blood. Thus, the filtering efficiency may be expressed as:

$$E = \frac{QF}{Pl} \times 100(\%)$$

where Pl: plasma content per unit volume of the blood

As may be seen from Table 3 above, with many comparative examples, the shear rate exceeded an allowable limit of 1,000 sec$^{-1}$, when the channel thickness was 50μ. With these comparative examples, hemolysis of the blood frequently occurred, the pressure drop increased significantly, and the hemoglobin concentration from the hemolysis also increased.

In the examples, better results were obtained when the shear rate was less than 500 sec$^{-1}$.

As may be seen from the comparative examples, when the channel thickness exceeded 150μ, the filtering efficiency or the plasma filtration rate per unit area of the membrane was low, providing a totally impractical plasma separator, taking the economic aspect into consideration.

The reason why the upper limit of the pressure drop was set to be 0.4 kg/cm$^2$ according to the present invention may be seen by the values of the pressure drop in Example Nos. 23 and 24 and the Comparative Example No. 1 in Table 3.

What is claimed is:

1. A plasma separator comprising:
   (a) a casing having a blood inlet port, a filtrate outlet port for recovering filtered plasma and a blood outlet port;
   (b) a plurality of membrane units piled one above the other acting as filter means arranged within said casing, said membrane unit comprising a filter membrane and a core material superposed one upon the other such that said core material is wrapped in said filter membrane;
   (c) a plurality of substantially flat blood channels which are formed between said membrane units and through which blood introduced said blood inlet port is continuously allowed to flow for plasma separation, said plurality of substantially flat blood channels each having a predetermined effective membrane area defined by a channel width and a channel length, and a channel thickness;
   (d) a plurality of plate-like spacers, each said spacer having no blood flow path formed therein and each said spacer being interposed between respective adjacent membrane units at a distance from adjacent membrane units and in a parallel relationship thereto, thereby defining said plurality of substantially flat blood channels between at least one spacer and said adjacent membrane units, said plurality of spacers each having two main surfaces and a number of small projections formed at both moain surfaces thereof;
   (e) said filter membrane of said membrane unit comprising a microporous filter membrane having a pore size of 0.1 to 0.8μm, a thickhess of from 100 to 300 μm and a porosity of from: 70 to 90%;
   (f) said channel thickness of said plurality of substantially flat blood channels being within the range of from 50 to 150 μm;
   (g) said channel width a (cm) of said plurality of substantially flat blood channels being so set as to satisfy the following relationship:

$100 \leq 6Q/ab^2 \leq 1000$ (sec$^{-1}$).

where Q denotes a blood flow rate (cm$^3$/sec) corresponding to 50 ml/min. to 500 ml/min., and b denotes said channel thickness; and
   (h) said channel width, channel thickness and channel length being so predetermined as to set a pressure drop PD of blood between said blood inlet and outlet ports within the range in which the relation $0 < PD \leq 0.4$ (Kg/cm$^2$) is held.

2. The plasma separator according to claim 1, wherein said pore size of said microporous filter membrane is 0.2 to 0.6μ.

3. The plasma separator according to claim 1, wherein said thickness of said microporous filter membrane is 150±20 μ.

4. The plasma separator according to claim 1, wherein said microporous membrane is made of a cellulose ester.

5. The plasma separator according to claim 4, wherein said microporous membrane is made of cellulose acetate.

6. The plasma separator according to claim 1, wherein said core material comprises an open screen mesh having a filment diameter of 100 to 600 μ and a mesh of 10 to 100/inch.

7. The plasma separator according to claim 6, wherein said core material has a pitch of 100 to 400μ of the protruding part and a thickness of 200 to 1200μ.

8. The plasma separator according to claim 1, wherein said core material comprises a plate-shaped element having a rough outer surface.

9. The plasma separator according to claim 1, comprising a plurality of said membrane units piled one above the other inside said casing with a predetermined distance between each paif of adjacent membrane units, said substantially flat blood channel being defined between each pair of said adjacent membrane units.

10. The plasma separator according to claim 1, comprising a plate-shaped spacer interposed between each pair of said adjacent membrane units at a distance from said adjacent units and in a substantially parallel relationship thereto, said substantially flat flood channels between defined surfaces of said spacer and the membrane unit opposing said spacer.

11. The plasma separator according to claim 10, wherein said spacer have a rough outer surface.

12. The plasma separator according to claim 10, wherein said spacer has a substantially flat surface.

13. The plasma separator according to claim 12, wherein said spacers have a rough outer surface.

14. The plasma separator according to claim 1, wherein the length of each of said substantially flat blood channels is from 4 to 10 cm.

15. The plasma separator according to claim 1, wherein said plurality of membrane units comprises from 10 to 30 membrane units piled inside said casing so as to provide an effective membrane area of from 3000 to 10,000 cm$^2$.

16. A method for separating plasma from whole blood, comprising:
   (1) providing a plasma separator, said plasma separator including:

(a) a casing having a blood inlet port, a filtrate outlet port for recovering filtered plasma and a blood outlet port;

(b) a plurality of membrane units piled one above the other acting as filter means arranged within said casing, said membrane unit comprising a filter membrane and a core material superposed one upon the other such that said core material is wrapped in said filter membrane;

(c) a plurality of substantially flat blood channels which are formed between said membrane units and through which blood introduced through said blood inlet port is continuously allowed to flow for plasma separation, said plurality of substantially flat blood channels each having a predetermined effective membrane area defined by a channel width and a channel length, and a channel thickness;

(d) a plurality of plate-like spacers, each said spacer having no blood flow path formed therein and each said spacer being interposed between respective adjacent membrane units at a distance from adjacnet membrane units and in a parallel relationship thereto, thereby defining said plurality of substantially flat blood channels between at least one spacer and said adjacent membrane units, said plurality of spacers each having two main surfaces and a number of small projections formed at both main surfaces thereof;

(e) said filter membrane of said membrane unit comprising a microporous filter membrane having a pore size of 0.1 to 0.8 $\mu$m, a thickness of from 100 to 300 $\mu$m and a porosity of from 70 to 90%;

(f) said channel thickness of said plurality of substantially flat blood channels being within the range of from 50 to 150 $\mu$m;

(g) said channel width a (cm) of said plurality of substantially flat blood channels being so set as to satisfy the following relationship:

$$100 \leq 6Q/ab^2 \leq 1000 \ (sec^{-1})$$

where Q denotes a blood flow rate (cm$^3$/sec) corresponding to 50 ml/min. to 500 ml/min., and b denotes said channel thickness; and (h) said channel width, channel thickness and channel length being so predetermined as to set a pressure drop PD of blood between said blood inlet and outlet ports within the range in which the relation $0 < PD \leq 0.4$ (Kg/cm$^2$) is held;

(2) introducing whole blood into said plasma separator through said blood inlet port;

(3) allowing said blood to flow in said blood channels and filtering said blood through said membrane units to separate blood plasma from said whole blood as a filtrate; and (4) recovering said blood plasma through said filtrate outlet port.

* * * * *

UNITED STATES PATENT AND TRADEMARK OFFICE
CERTIFICATE OF CORRECTION

PATENT NO. : 4,631,130
DATED : December 23, 1986
INVENTOR(S) : Masaharu WATANABE It is certified that error appears in the above-identified patent and that said Letters Patent is hereby corrected as shown below:

Column 7, line 50, insert --core-- after "mesh".

Column 11, line 40, change "20 μ m/min." to --20 ℓ m/min,--.

Column 12, line 42, change "significat" to --significant--.

Column 13, line 28, in the line of formula, change "/AB$^3$" to --/aNb$^3$--.

Column 14, line 1, change "as" to --are--.

Column 19, claim 16, lines 22-23; change "adjac-net" to --adjacent--.

Column 18, claim 9, line 42, change "channel" to --channels--.

Column 18, claim 10, line 1, change "to claim 1" to --to claim 9--

Column 18, claim 10, line 49, change "between defined surfaces" to --being defined between surfaces--.

Column 18, claim 12, line 54, change "spacer has" to --spacers have--.

Column 18, claim 11, line 52, change "spacer" to --spacers--.

In the Abstract, line 5, delete "of".

Signed and Sealed this

Fifth Day of July, 1988

*Attest:*

DONALD J. QUIGG

*Attesting Officer*   *Commissioner of Patents and Trademarks*